United States Patent
Zahn et al.

(10) Patent No.: US 7,145,115 B2
(45) Date of Patent: Dec. 5, 2006

(54) APPARATUS FOR HARDENING A CYLINDRICAL BEARING ON A SHAFT BY MEANS OF INDUCTION HEATING UTILIZING AN ELASTIC ELEMENT

(75) Inventors: Andreas Zahn, Riegel (DE); Ralph Gerbeth, Hüttlingen (DE)

(73) Assignee: Maschinenfabrik Alfing Kessler GmbH (DE)

( * ) Notice: Subject to any disclaimer, the term of this patent is extended or adjusted under 35 U.S.C. 154(b) by 5 days.

(21) Appl. No.: 10/913,244

(22) Filed: Aug. 6, 2004

(65) Prior Publication Data

US 2006/0027569 A1  Feb. 9, 2006

(51) Int. Cl.
*H05B 6/10* (2006.01)
*H05B 6/40* (2006.01)

(52) U.S. Cl. .............. 219/639; 219/635; 219/672; 219/676; 148/567; 266/129

(58) Field of Classification Search ........ 219/635, 219/639, 640, 652, 672–676; 148/572, 573, 148/567; 266/129
See application file for complete search history.

(56) References Cited

U.S. PATENT DOCUMENTS 6,140,625 A * 10/2000 Gezarzick et al. ......... 219/639
6,160,248 A * 12/2000 Ottenwaelder et al. ..... 219/639
6,399,928 B1    6/2002 Gezarzick et al.

* cited by examiner

*Primary Examiner*—Philip H. Leung
(74) *Attorney, Agent, or Firm*—Todd S. Parkhurst; Holland & Knight LLP

(57) ABSTRACT

An apparatus for hardening cylindrical bearing locations on a shaft, in particular a crankshaft, in which transition radii to the adjacent shaft parts are of undercut design, is provided with a heating unit, which is connected to a power supply, and with an inductor. The inductor has two heating conductor arms, which are arranged at a distance from one another and each run in the peripheral direction of the bearing location that is to be hardened. Each of the two heating conductor arms is provided with an inner bearing-surface hardening branch and two outer radius hardening branches, the bearing-surface hardening branch in each case being mechanically connected to the radius hardening branches by current-carrying elements which bear the radius hardening branches. The mechanical connection is sufficiently elastic for the radius hardening branches to be displaceable relative to the bearing-surface hardening branch in the axial direction of the shaft that is to be hardened.

11 Claims, 4 Drawing Sheets

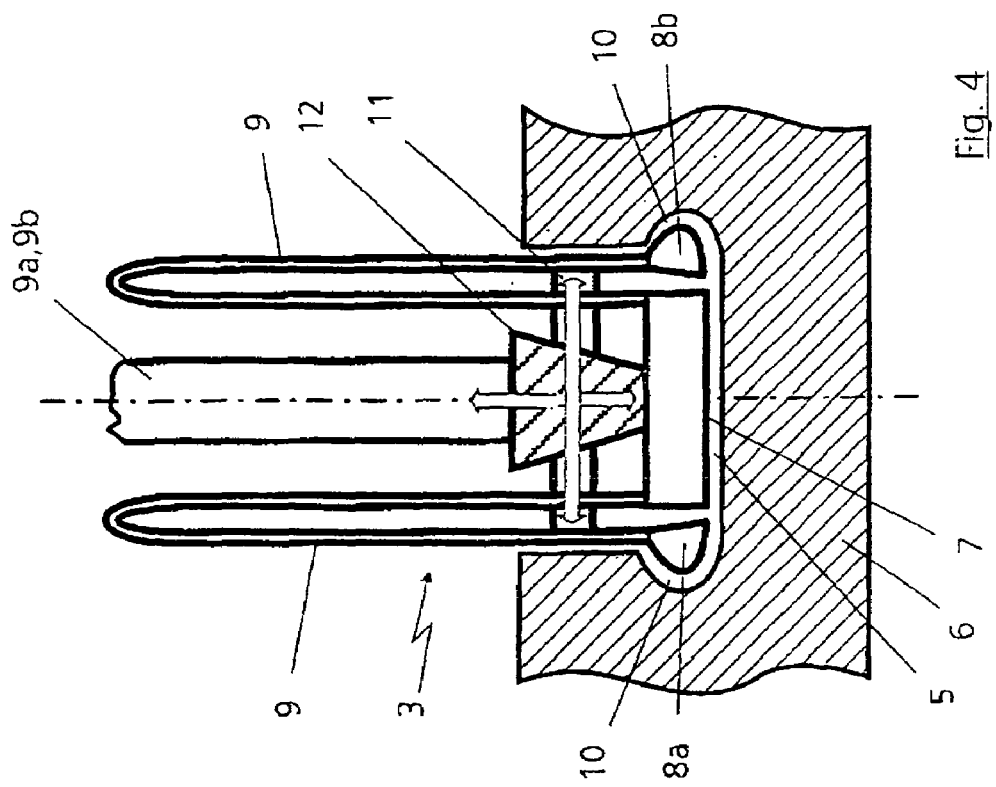
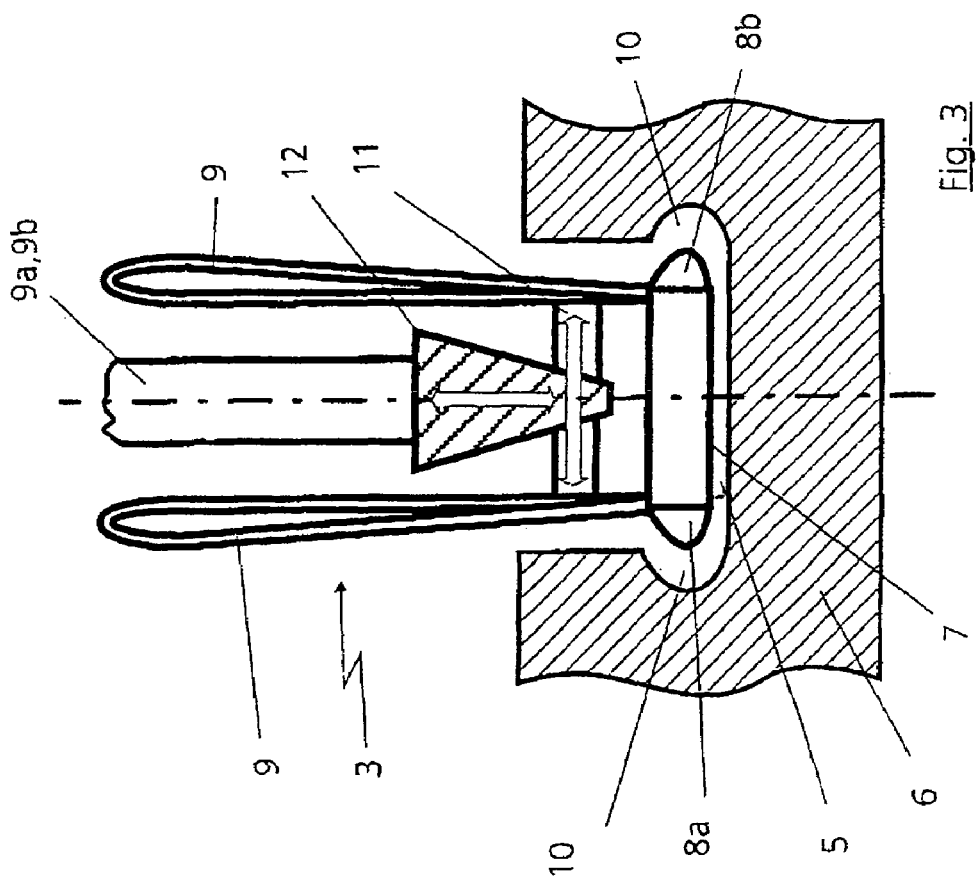

APPARATUS FOR HARDENING A CYLINDRICAL BEARING ON A SHAFT BY MEANS OF INDUCTION HEATING UTILIZING AN ELASTIC ELEMENT

BACKGROUND OF THE INVENTION

1. Field of the Invention

The invention relates to an apparatus for hardening cylindrical bearing locations on a shaft, in particular a crankshaft, in which transition radii to the adjacent shaft parts are of undercut design. The invention also relates to a process for hardening cylindrical bearing locations of this type.

2. Description of the Related Art

U.S. Pat. No. 6,399,928 has illustrated and described an apparatus for hardening cylindrical bearing locations on a shaft, two independent heating units, each having an inductor, being provided. Each inductor is in this case provided with two heating conductor arms arranged at a distance from one another. Each of the two heating conductor arms has an outer heating conductor branch and an inner heating conductor branch. The bearing surface of the bearing location that is to be hardened is hardened using the inner heating conductor branches and the undercut transition radii are hardened using the outer heating conductor branches. To harden the undercut transition radii, the two inductors are in each case displaced following a radial advance in the axial direction—with respect to the shaft or bearing location that is to be hardened—so that the heating conductor branches can accordingly be introduced into the undercut transition radii. To ensure that there are no unhardened or insufficiently hardened areas in the central region of the bearing surface, the inner heating conductor branches must cover one another in an overlap region as seen in the peripheral direction, but without touching one another. The two heating units with their inductors which operate independently of one another make it possible to dispense with electrical cross-connections between the inductors and the respectively associated heating unit and also in the coolant supply, which are susceptible to faults. However, one drawback of this is that the apparatus is relatively expensive compared to the prior art, on account of the duplication of the heating units with their two inductors. Furthermore, relatively high masses have to be moved during the axial advance of the outer heating conductor arms, which likewise results in a relatively high level of outlay, and is also susceptible to faults.

SUMMARY OF THE INVENTION

Therefore, the present invention is based on the object of avoiding electrical cross-connections, which are susceptible to faults, reducing the outlay on apparatus when providing a hardening apparatus and a hardening process which allow hardening even of transition radii that are of undercut design in a structurally simple manner and without the need for a second heating unit.

According to the invention, this object is achieved by virtue of the fact that a heating unit, which is connected to a power supply, has an inductor, which includes two heating conductor arms that are arranged at a distance from one another and each run in the peripheral direction of the bearing location that is to be hardened, each of the two heating conductor arms having an inner bearing-surface hardening branch and two outer radius hardening branches, the bearing-surface hardening branch in each case being mechanically connected to the radius hardening branches by current-carrying elements which bear the radius hardening branches, and the mechanical connection, however, being sufficiently elastic for the radius hardening branches to be displaceable relative to the bearing-surface hardening branch in the axial direction of the shaft that is to be hardened.

Unlike in the prior art, in which two heating units having two inductors are provided and have to be displaced in their entirety, as complete units, in the axial direction in order for the radius hardening branches to be introduced into the undercut transition radii, in the solution according to the invention only a single heating unit with associated inductor is required. According to the invention, the axial displaceability of the radius hardening branches to allow them to be introduced into the transition radii is achieved by virtue of the current-carrying elements being correspondingly elastic, thereby allowing the required relative movement. Instead of power cables as current-carrying elements, the current-carrying elements are now designed, according to the invention, in such a way that they simultaneously also support the radius hardening branches. Nevertheless, they are configured in such a manner as to permit axial displacement movement. Unlike in the prior art, therefore, it is no longer necessary for the entire heating unit together with the inductor to be displaced, but rather it is merely necessary for the radius hardening branches to be displaced in the axial direction relative to the associated bearing-surface hardening branch and therefore also the associated inductor, so that they can move into the transition radii. This means that the masses which have to be moved are significantly lower, which reduces both the outlay on design and the susceptibility to faults.

To achieve the required elasticity of the current-carrying elements, various configurations are possible.

One advantageous configuration may consist in the fact that current-carrying elements approximately take the form of a loop, the ends of the loop respectively being connected to the bearing-surface hardening branch and the radius hardening branches, and the loop extending in the radial direction—with respect to the shaft—between the two ends.

Configuring the current-carrying elements in each case in the form of a loop, which may preferably take the shape of a tuning fork, makes it possible, in conjunction with a suitable selection of materials, to achieve a sufficient elasticity for axial displacement of the radius hardening branches. In general, copper, which has a suitable elasticity, is used for the current-carrying elements.

If, in a highly advantageous configuration, the current-carrying elements are configured as hollow profiled sections, preferably in tube, plate or strip form, it is simultaneously also possible for coolant to be supplied and discharged in the interior of the current-carrying elements. This eliminates the need for separate coolant lines.

The radius hardening branches can be displaced in the axial direction in various ways. By way of example, displacement devices with mechanical displacement elements, preferably a wedge or knee lever device, are possible for this purpose, allowing the two radius hardening branches of a heating conductor arm to be displaced together with respect to the bearing-surface hardening branch located between them.

Of course, however, it is also possible to use hydraulic, pneumatic or electrical displacement elements.

The displacement device will advantageously be provided with restoring elements which move the radius hardening branches back into their starting position after the hardening operation has ended; i.e. they move the radius hardening branches out of the undercut transition radii if they do not automatically return to their starting positions on account of the elasticity of the current-carrying elements.

Advantageous refinements and configurations will emerge from the exemplary embodiment which is described in principle below with reference to the drawing.

BRIEF DESCRIPTION OF THE DRAWINGS

FIG. 3 shows an enlarged illustration of the inductor with a heating conductor arm in the introduced position, FIG. 4 shows an enlarged illustration of the inductor with a heating conductor arm in the introduced position with axially extended radius hardening branches.

DETAILED DESCRIPTION

Figure 2:
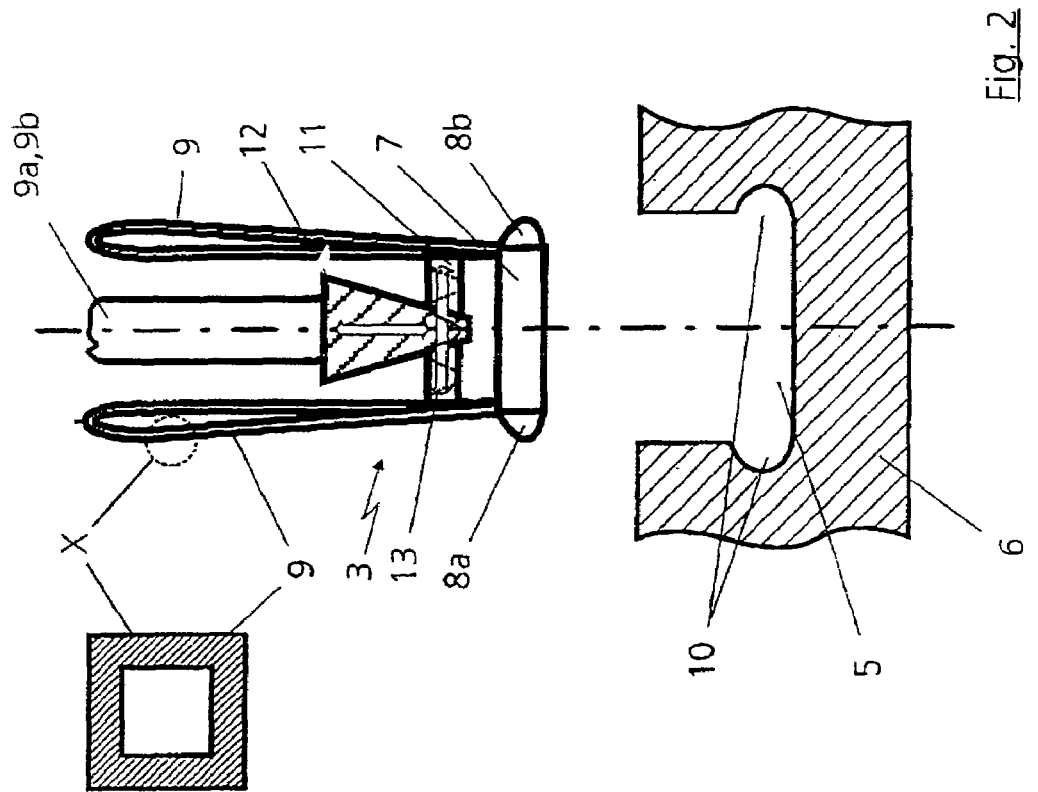
FIG. 2 shows an enlarged illustration of the inductor with a heating conductor arm in accordance with FIG. 1.
Figure 1:
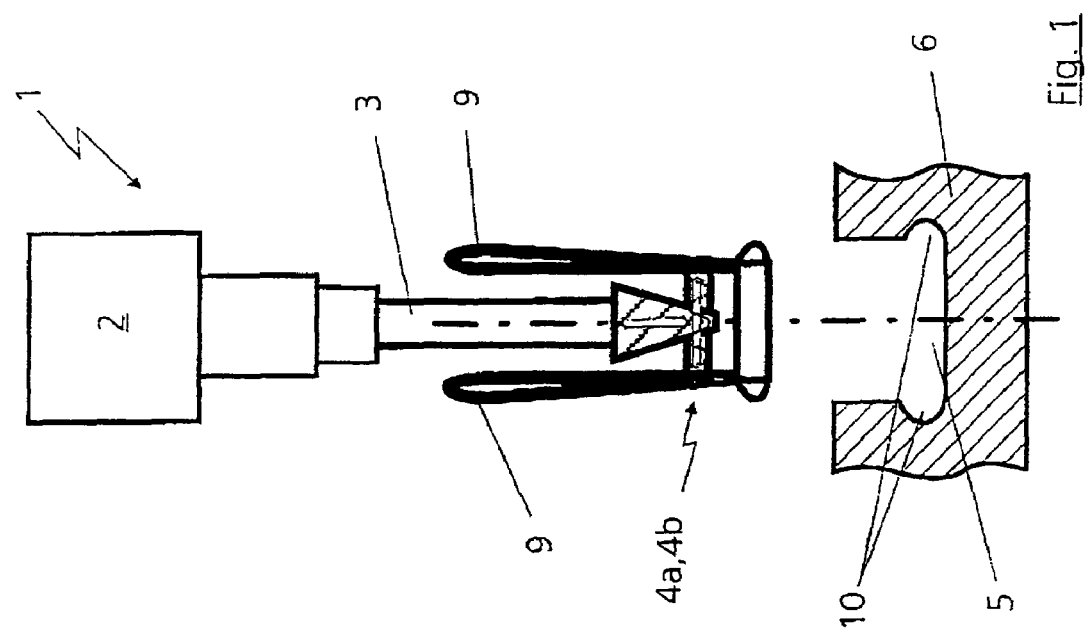
FIG. 1 shows an overview illustration of an apparatus for hardening cylindrical bearing locations, having a heating unit and an inductor.

The apparatus explained below for hardening cylindrical bearing locations on a shaft, in particular a crankshaft, is fundamentally of a known design, and consequently only those parts which are pertinent to the invention are dealt with in more detail. Reference should be made, for example, to U.S. Pat. No. 6,399,928 for details as to the structure and mode of action of a hardening process and apparatus. The hardening apparatus has a heating unit 1 with a power supply device 2 and an inductor 3, which is connected to the power supply device 2. At the lower end, the inductor has two heating conductor arms 4a and 4b, also known as heating conductor loops (cf. FIG. 6), which engage around the circumferential side of a bearing location 5 that is to be hardened on a crankshaft 6, only part of which is illustrated; they engage around less than 180 degrees of the circumferential side.

Each heating conductor arm 4a and 4b is provided with a bearing-surface hardening branch 7 and two radius hardening branches 8a and 8b arranged on either side of the bearing-surface hardening branch 7.

The connection between the bearing-surface hardening branch 7 and the two radius hardening branches 8a and 8b is made by current-carrying elements 9. In cross section, the current-carrying elements 9 have a rectangular hollow section shape (cf. detail X from FIG. 2) and a loop form, such that one end of the loop is connected to the bearing-surface hardening branch 7 and the other end is connected to a radius hardening branch 8a or 8b (cf. diagrammatic plan view or developed view in FIG. 5).

As can be seen from the figures, the current-carrying elements 9 are approximately in the shape of a tuning fork, with the bend or loop extending in the radial direction.

Coolant is supplied in the open interior of the hollow profile shapes of the current-carrying elements 9, for which purpose the current-carrying elements 9 are correspondingly connected to a coolant connection and a coolant outlet (not shown). Since the cooling water is supplied and discharged in the interior of the current-carrying elements 9, successful cooling is therefore also ensured in the same way. The current and coolant are supplied centrally via a feed line 9a, from which they are then passed onward, via the current-carrying elements 9, which resemble tuning forks, in each case via a split bearing-surface hardening branch 7, then the radius hardening branch 8b, back to a bearing-surface hardening branch 7 then onward via the radius hardening branch 8a and back to the split bearing-surface hardening branch 7, from where they are returned via a return line 9b (cf. FIGS. 5 and 6). To carry cooling liquid, as is fundamentally known, the bearing-surface hardening branches 7 and the radius hardening branches 8a and 8b are likewise designed as hollow profiled sections and are correspondingly connected to the current-carrying elements 9.

As can be seen, the two radius hardening branches 8a and 8b are each supported by two current-carrying elements 9 and at the same time are also mechanically connected to the bearing-surface hardening branch 7. However, the shape of the current-carrying elements 9 means that an elastic connection is produced. As can be seen in particular from FIG. 2, the two heating conductor arms 4a and 4b of the inductor 3, in the at-rest state, which corresponds to the state in which the inductor 3 is moved toward the bearing location 5 that is to be hardened, each have a width which corresponds at most to the width of the bearing location 5. In this way, it is possible for the heating conductor arms 4a and 4b to be radially advanced for hardening until they are in their hardening position. As can also be seen from FIG. 2, the bearing location in each case has an undercut transition radius 10 on both sides in the axial direction. When the inductor 3 with the two heating conductor arms 4a and 4b is in its hardening position and therefore in the region of the bearing location 5 that is to be hardened and of the two transition radii 10, a displacement device 11, which is not illustrated in more detail, is activated so as to displace the two radius hardening branches 8a and 8b of each heating conductor arm 4a and 4b, respectively, in the axial direction so that they can be introduced into the undercut transition radii 10. The displacement device 11 may, for example, have a part, for example a wedge 12, which is adjustable in the radial direction and presses the current-carrying elements 9 or the parts connected thereto apart in the event of a radial displacement in the direction toward the shaft 6 (cf. arrow), so that they can be introduced into the undercut transition radii 10. A knee lever device between the two radius hardening branches 8a and 8b can also be used to move the two radius hardening branches apart in the axial direction when the knee lever device is actuated.

The mechanical displacement device 11 may additionally be provided with a restoring element, e.g. return spring elements 13 (cf. dashed illustration in FIG. 2).

Figure 5:
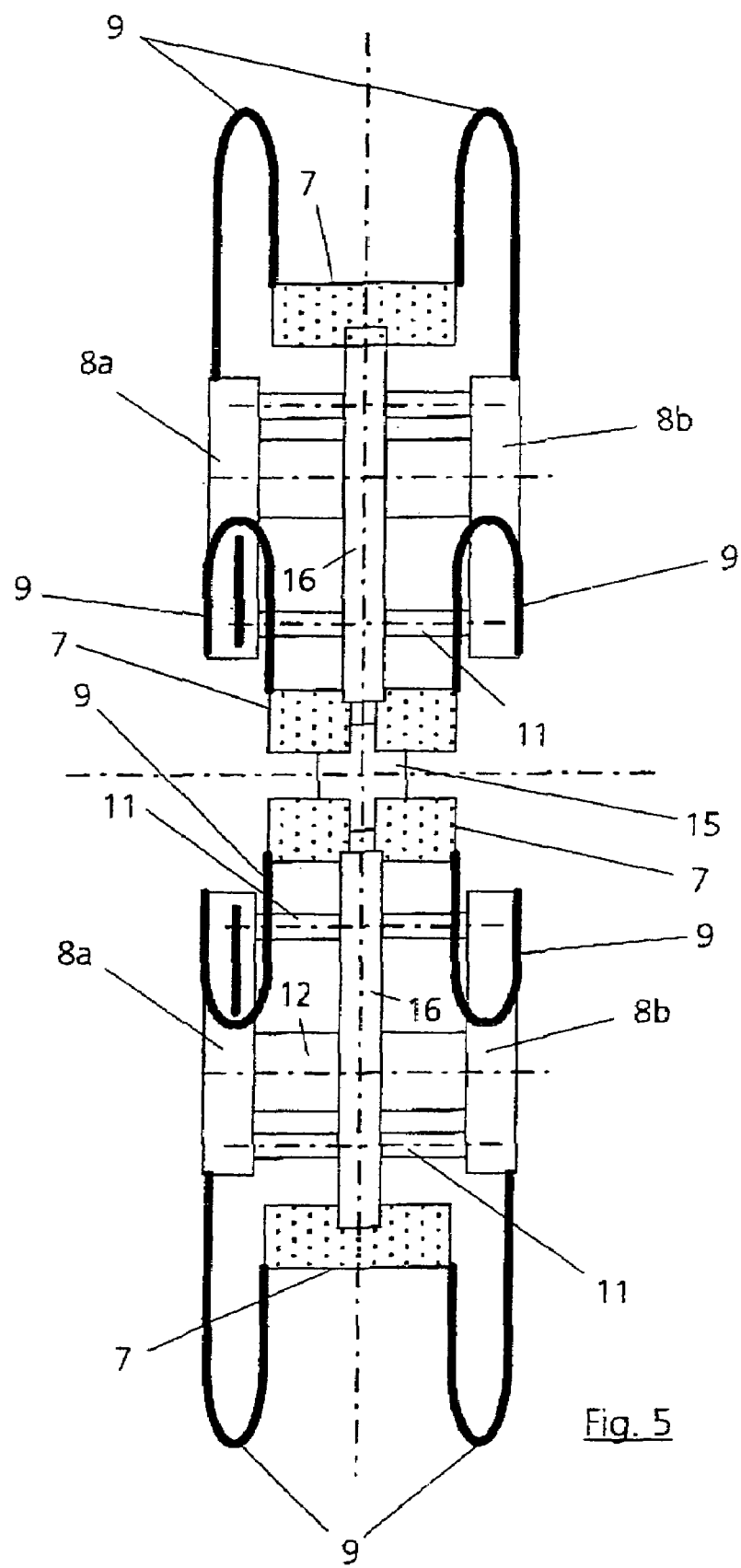
FIG. 5 shows an outline illustration of the apparatus according to the invention, including the current and water circuits in the inductor, in plan view.

As can be seen from FIG. 5, the radius hardening branches 8a and 8b are circumferentially offset with respect to the respectively associated bearing-surface hardening branch 7, for space and movement reasons.

Figure 6:
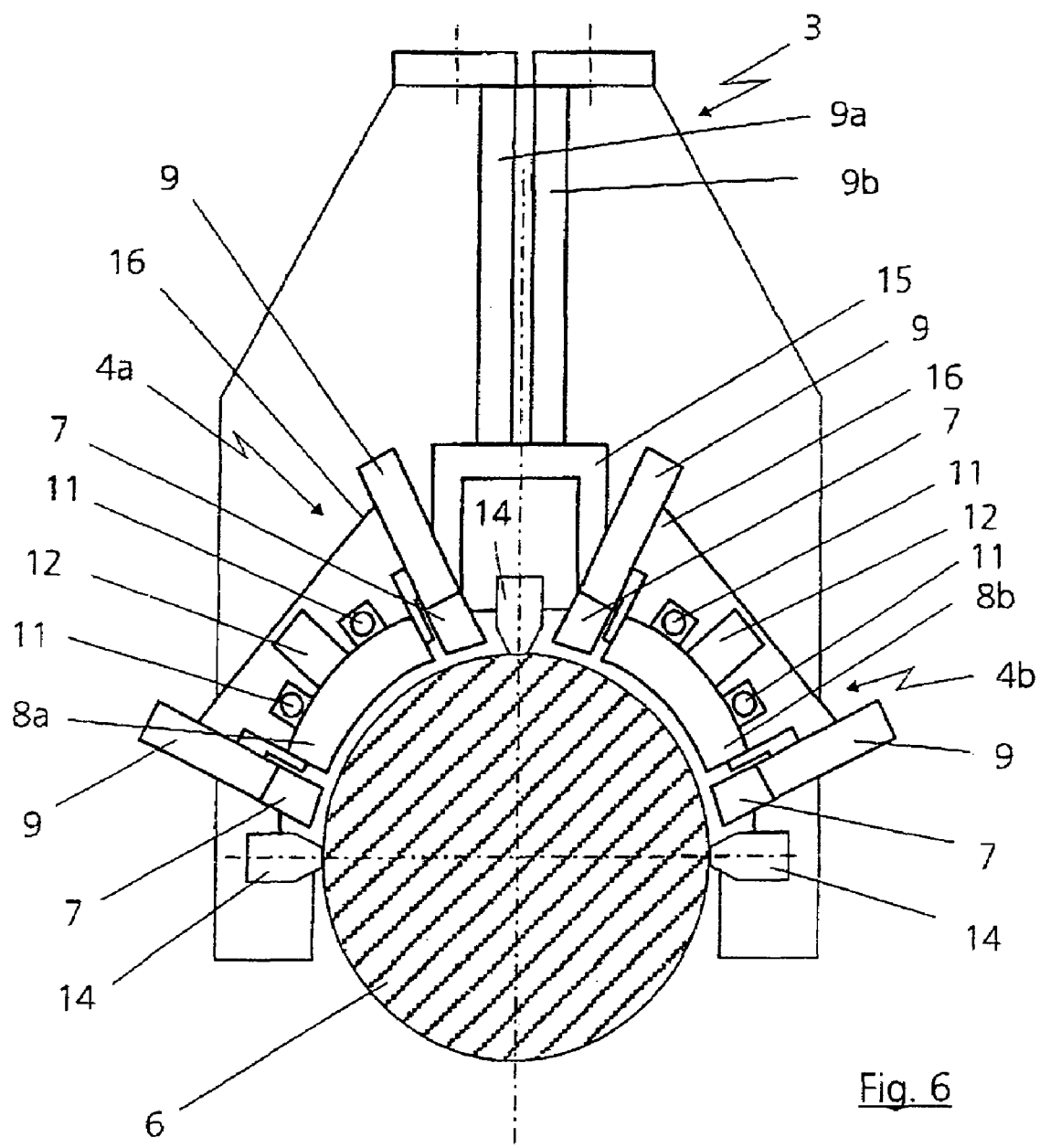
FIG. 6 shows a view of the apparatus according to the invention from the axial direction.

The two semiconductor arms 4a and 4b on the shaft 6 are guided in a known way using sliding shoes 14, which are only indicated in FIG. 6. The connections between the two semiconductor arms 4a and 4b are effected by means of a U-shaped connecting element 15. Reinforcing ribs 16 extending in the circumferential direction may be provided for the purpose of reinforcing the bearing-surface hardening branches 7.

What is claimed is:

1. An apparatus for hardening cylindrical bearing locations on a crankshaft having at least one bearing surface and having undercut surfaces adjacent the bearing surface, the undercut surfaces being defined by transition radii, the apparatus having a heating unit which is connected to a power supply, the apparatus further having an inductor which includes two heating conductor arms that are arranged at a distance from one another and in the peripheral direction of the, bearing, each of the two heating conductor arms having an inner bearing-surface hardening branch and two outer radius hardening branches, the bearing-surface hardening branch being mechanically connected to the radius hardening branches by current-carrying elements which bear the radius hardening branches, the current-carrying elements taking the form of a deformable loop, the ends of the loop respectively being connected to the bearing-surface hardening branch and to the radius hardening branches, and the loop extending in the radial direction, with respect to the shaft between the two ends, the mechanical connection being sufficiently elastic for the radius hardening branches to be displaceable relative to the bearing-surface hardening branch in the axial direction of the shaft that is to be hardened.

2. The apparatus as claimed in claim 1, wherein the current-carrying elements are at least approximately in the shape of a tuning fork.

3. The apparatus as claimed in claim 1, where in the current-carrying elements are formed as hollow profiled sections.

4. The apparatus as claimed in claim 1, where in the current-carrying elements are at least approximately in plate, tube or strip form.

5. The apparatus as claimed in claim 4, wherein the current-carrying elements, in cross section, are in the form of a rectangular hollow section.

6. The apparatus as claimed in claim 1, wherein the radius hardening branches are provided with a displacement device for the axial displacement thereof.

7. The apparatus as claimed in claim 6, wherein the displacement device has mechanical displacement elements.

8. The apparatus as claimed in claim 7, wherein the displacement device has a wedge or knee lever device.

9. The apparatus as claimed in claim 6, wherein hydraulic, pneumatic or electrical displacement elements are provided.

10. The apparatus as claimed in claim 6, wherein the displacement device is provided with restoring elements.

11. The apparatus as claimed in claim 10, wherein the restoring elements are provided with return spring elements.

* * * * *